US008816205B2

(12) United States Patent
Montena et al.

(10) Patent No.: US 8,816,205 B2
(45) Date of Patent: Aug. 26, 2014

(54) CONDUCTIVE ELASTOMER AND METHOD OF APPLYING A CONDUCTIVE COATING TO A CABLE

(75) Inventors: Noah Montena, Syracuse, NY (US); Mary Krenceski, Troy, NY (US)

(73) Assignee: PPC Broadband, Inc., East Syracuse, NY (US)

( * ) Notice: Subject to any disclaimer, the term of this patent is extended or adjusted under 35 U.S.C. 154(b) by 377 days.

(21) Appl. No.: 13/157,446

(22) Filed: Jun. 10, 2011

(65) Prior Publication Data

US 2011/0232937 A1 Sep. 29, 2011

Related U.S. Application Data

(63) Continuation-in-part of application No. 12/418,103, filed on Apr. 3, 2009, now Pat. No. 8,071,174.

(51) Int. Cl.
*H01B 7/18* (2006.01)
*H01B 9/02* (2006.01)

(52) U.S. Cl.
USPC .... 174/105 R; 174/103; 174/107; 174/110 R; 174/102 C; 174/113 R; 427/384

(58) Field of Classification Search
None
See application file for complete search history.

(56) References Cited

U.S. PATENT DOCUMENTS

| | | | |
|---|---|---|---|
| 4,731,282 A | 3/1988 | Tsukagoshi et al. | |
| 4,820,446 A | 4/1989 | Prud'Homme | |
| 4,956,203 A | 9/1990 | Kroupa | |
| 4,971,727 A | 11/1990 | Takahashi et al. | |
| 5,043,530 A * | 8/1991 | Davies | 174/36 |
| 5,227,093 A | 7/1993 | Cole et al. | |
| 5,359,735 A | 11/1994 | Stockwell | |
| 5,464,661 A | 11/1995 | Lein et al. | |
| 5,696,196 A | 12/1997 | DiLeo | |
| 5,770,216 A | 6/1998 | Mitchnick et al. | |
| 5,788,666 A | 8/1998 | Atanasoska | |
| 5,949,018 A * | 9/1999 | Esker | 174/23 R |
| 5,949,029 A | 9/1999 | Crotzer et al. | |
| 6,117,539 A | 9/2000 | Crotzer et al. | |
| 6,180,221 B1 | 1/2001 | Crotzer et al. | |

(Continued)

FOREIGN PATENT DOCUMENTS

| | | |
|---|---|---|
| EP | 1717905 A1 | 11/2006 |
| GB | 2450248 | 12/2008 |
| JP | 2004176005 A | 6/2004 |
| WO | 2008066995 A2 | 6/2008 |

OTHER PUBLICATIONS

Final Office Action (Mailed Date: Jan. 12, 2012); U.S. Appl. No. 13/095,228, filed Apr. 27, 2011.
PCT/US2010/029593 International Filing Date: Apr. 1, 2010; International Search Report and Written Opinion; Mailed Date: Nov. 12, 2010; 10 pages.

(Continued)

*Primary Examiner* — Jayprakash N Gandhi
*Assistant Examiner* — Dion R Ferguson
(74) *Attorney, Agent, or Firm* — Hiscock & Barclay LLP

(57) ABSTRACT

A cable is provided, the cable includes: a conductor configured to propagate a signal; an elastomeric layer surrounding the center conductor; and a conductive topcoat layer surrounding and bonded to the elastomeric layer. The conductive topcoat layer includes a suspension of conductive particles. The conductive topcoat layer is formed by curing a topcoat and conductive paste mixture applied to the elastomeric layer.

50 Claims, 15 Drawing Sheets

(56) References Cited

U.S. PATENT DOCUMENTS

| | | | |
|---|---|---|---|
| 6,375,866 B1 | 4/2002 | Paneccasio, Jr. et al. | |
| 6,416,847 B1 | 7/2002 | Lein et al. | |
| 6,465,550 B1 | 10/2002 | Kleyer et al. | |
| 6,674,012 B2 | 1/2004 | Beele | |
| 7,026,382 B2 | 4/2006 | Akiba et al. | |
| 8,071,174 B2 | 12/2011 | Krenceski | |
| 8,157,589 B2 | 4/2012 | Krenceski et al. | |
| 2002/0010415 A1* | 1/2002 | Simon | 604/20 |
| 2004/0018312 A1 | 1/2004 | Halladay | |
| 2005/0098344 A1* | 5/2005 | Ysbrand | 174/102 SC |
| 2005/0109994 A1 | 5/2005 | Matheson et al. | |
| 2006/0154519 A1 | 7/2006 | Montena | |
| 2006/0166552 A1 | 7/2006 | Bence | |
| 2007/0077360 A1 | 4/2007 | Kashiwagi et al. | |
| 2008/0251270 A1* | 10/2008 | Lee et al. | 174/105 R |
| 2009/0220794 A1 | 9/2009 | O'Neill et al. | |
| 2010/0239871 A1 | 9/2010 | Scheffer et al. | |
| 2011/0200834 A1 | 8/2011 | Krenceski | |
| 2012/0202378 A1 | 8/2012 | Krenceski et al. | |

OTHER PUBLICATIONS

Office Action (Mailed Date: Mar. 30, 2011); U.S. Appl. No. 12/418,103, filed Apr. 3, 2009.

U.S. Appl. No. 13/095,228, filed Apr. 27, 2011, Conf. No. 2191.

U.S. Appl. No. 13/448,937, filed Apr. 17, 2012.

Office Action (Mailed Date: May 17, 2012); U.S. Appl. No. 13/095,228, filed Apr. 27, 2011.

Notice of Allowance (Mailed Date: Aug. 23, 2012); U.S. Appl. No. 13/095,228, filed Apr. 27, 2011.

Flexible, High Temperature, Electrically Conductive Adhesive. Creative Materials, Inc. [online]. 1 page [retrieved on Jun. 22, 2011]. Retrieved from the Internet<URL: http://servercreativematerials.com/datasheets/DS_102_32.pdf>.

Notice of Allowance (Mailed Date: Aug. 5, 2011); U.S. Appl. No. 12/418,103, filed Apr. 3, 2009.

Office Action (Mailed Date: Aug. 15, 2011); U.S. Appl. No. 13/095,228, filed Apr. 27, 2011.

U.S. Appl. No. 13/118,617, filed May 31, 2011, Conf. No. 9920.

* cited by examiner

CONDUCTIVE ELASTOMER AND METHOD OF APPLYING A CONDUCTIVE COATING TO A CABLE

PRIORITY CLAIM CROSS REFERENCE TO RELATED APPLICATIONS

This application is a continuation-in-part and claims priority from U.S. application Ser. No. 12/418,103, filed on Apr. 3, 2009, and entitled CONDUCTIVE ELASTOMER AND METHOD OF APPLYING A CONDUCTIVE COATING TO ELASTOMERIC SUBSTRATE, now U.S. Pat. No. 8,071,174.

CROSS REFERENCE TO RELATED APPLICATION

This application is related to the following commonly-owned, co-pending patent applications: U.S. patent application Ser. No. 13/448,937, filed on Apr. 17, 2012.

BACKGROUND OF THE INVENTION

1. Technical Field

The present invention relates to conductive coatings and, more particularly, a method for applying a silver-based conductive coating to an elastomeric layer in a cable.

2. Related Art

Conductive elastomers are useful for a variety of purposes, including the shielding of electrical components from electromagnetic interference and radio frequency interference. One method for forming such conductive elastomers typically involves forming the elastomers from a conductive material, such as forming from multiple layers of conductive and non-conductive materials into a composite that is both elastic and conductive by a rubber impregnated with conductive particles. Another method is to spray a conductive coating including conductive particles, such as copper and/or silver flakes, onto an elastomeric substrate. While these methods of forming conductive elastomers are useful, there are significant drawbacks, particularly with regard to the spray coating of a conductive substance onto an elastomeric substrate. For example, the conductive solution must be diluted with solvents containing volatile carbon compounds (VOCs), such as toluene, prior to spray coating. These VOCs are hazardous to workers and the environment due to hydrocarbon off-gassing during the manufacturing process. In addition, these VOCs do not necessarily promote effective bonding to the substrate and are therefore not as flexible as the substrate.

SUMMARY OF THE INVENTION

The present invention provides a safe method for applying conductive coating to elastomeric layers.

A first object of the present invention provides a method for applying conductive coatings that improves the bonding between the conductive solution and the substrate.

A second object of the present invention provides a method for applying conductive coatings that does not adversely affect the flexibility of the substrate.

A third object of the present invention provides a method for applying conductive coatings that may be sprayed on irregular surfaces and confined to only those surfaces that are desired to be conductive.

A fourth object of the present invention provides a cable comprising: a conductor configured to propagate a signal; an elastomeric layer surrounding the conductor; and a conductive topcoat layer surrounding and bonded to the elastomeric layer, wherein the conductive topcoat layer includes a suspension of conductive particles.

A fifth object of the present invention provides a cable comprising: an elongated elastomeric structure; and a first conductive topcoat layer surrounding and bonded to the elongated elastomeric structure, wherein the first conductive topcoat layer is formed from a suspension of conductive particles within a paste material, and wherein the conductive topcoat layer is configured to propagate a signal between two points.

A sixth object of the present invention provides a ribbon cable comprising: an elongated elastomeric structure; and a first conductive topcoat structure bonded to the elongated elastomeric structure, wherein the first conductive topcoat structure extends a length of the elongated elastomeric structure, and wherein the first conductive topcoat structure is configured to propagate a first signal; and a second conductive topcoat structure bonded to the elongated elastomeric structure, wherein the second conductive topcoat structure extends the length of the elongated elastomeric structure, wherein the second conductive topcoat structure is electrically isolated from the first conductive topcoat structure, wherein the second conductive topcoat structure is configured to propagate a second signal differing from said first signal, and wherein the first conductive topcoat structure and the second conductive topcoat structure are each formed from a suspension of conductive particles within a paste material.

A seventh object of the present invention provides a method of forming a cable, comprising the steps of: forming an elastomeric layer over a center conductor, wherein the center conductor is configured to propagate a signal; mixing a conductive paste with a topcoat; applying the topcoat and conductive paste mixture onto the elastomeric layer to at least partially coat the elastomeric layer; and curing the topcoat and conductive paste mixture to bond the topcoat and conductive paste to the elastomeric layer, wherein said curing results in a conductive topcoat layer formed over the elastomeric layer.

An eight object of the present invention provides a method of forming a cable, comprising the steps of: forming elongated elastomeric structure; mixing a conductive paste with a topcoat;
applying the topcoat and conductive paste mixture onto the elongated elastomeric structure to at least partially coat the elongated elastomeric structure; and curing the topcoat and conductive paste mixture to bond the topcoat and conductive paste to the elongated elastomeric structure, wherein said curing results in a conductive topcoat layer formed over the elongated elastomeric structure, and wherein the conductive topcoat layer is configured to propagate a signal between two points.

A ninth object of the present invention provides a method of forming a cable, comprising the steps of: forming elongated elastomeric structure; mixing a conductive paste with a topcoat;
first applying a first portion of the topcoat and conductive paste mixture onto the elongated elastomeric structure extending a length of the elongated elastomeric structure; second applying a second portion of the topcoat and conductive paste mixture onto the elongated elastomeric structure adjacent to the topcoat first portion and extending the length of the elongated elastomeric structure, wherein the first portion is isolated from the second portion; and curing the first portion and the second portion of the topcoat and conductive paste mixture to bond the first portion and the second portion to the elongated elastomeric structure, wherein said curing results in a first conductive topcoat layer and a second conductive topcoat layer formed over the elongated elastomeric structure, wherein the first conductive topcoat layer is electrically isolated from the second conductive topcoat layer, wherein the first conductive topcoat layer is configured to propagate a first signal, and wherein the second conductive topcoat layer is configured to propagate a second signal differing from the first signal.

In accordance with the foregoing objects and advantages, the present invention provides a method for spray coating a conductive ink onto an elastomeric substrate that reduces the need for toxic compounds and improves bonding between the conductive ink and substrate. The method comprises the use of reactive top coats formulated for use with silicone rather than solvents to achieve thinning of the conductive ink. The thinned ink may then be spray coated onto silicone elements to provide a conductive layer that is bonded to the silicone and that does not off-gas hydrocarbons during the manufacturing process.

DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
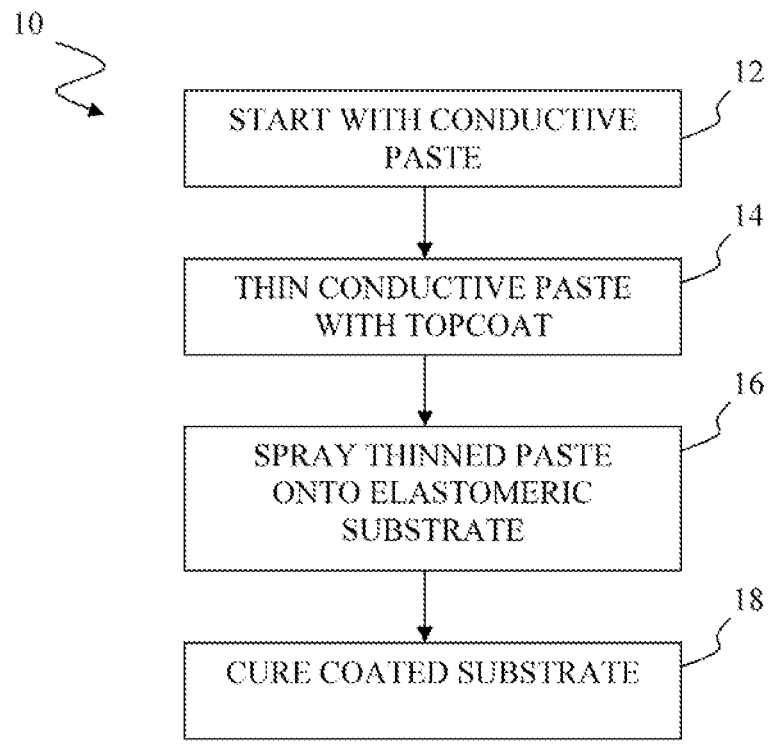
FIG. 1 is a flowchart of a method according to the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., which are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

Referring now to the drawings, wherein like reference numerals refer to like parts throughout, there is seen in FIG. 1, a flowchart of a method 10 according to the present invention for applying conductive coatings to elastomeric substrates. Method 10 begins with a conductive ink or paste 12. A conductive paste that is acceptable for use with the method of the present invention is silver 102-32 paste, available from Creative Materials, Inc. of Tyngsboro, Mass. The conductive ink or paste is then thinned 14 using a reactive topcoat rather than an organic solvent. For silver 102-32 paste, an effective topcoat is a mixture of liquid silicone rubber topcoat (LSR) TP3719A and TP3719B, both of which are available from Momentive Performance Materials of Leverkusen, Germany.

The LSR Topcoat TP3719A and B are preferably mixed in a 1:1 weight ratio. For example, the LSR topcoat may be mixed in a ratio of 10.2 grams of topcoat A to 10.4 grams of topcoat B to form an LSR topcoat A/B mixture. Five grams of silver 102-32 may then be mixed with one gram of the LSR topcoat A/B mixture and stirred to form a topcoat thinned ink that can be applied, such as by spray coating and the like, onto the silicone substrate using conventional applying or spraying processes, including without limitation, the use of an airbrush. Alternatively, a mixture of 5.2 grams of silver 102-32 paste and 2 grams of the LSR topcoat A/B mixture may also be used to form the topcoat thinned ink.

The topcoat thinned paste is then applied or sprayed 16 onto the desired elastomeric substrate, such as by spray coating using an air brush or other conventional applying or spraying apparatus. Preferably, the elastomeric substrate comprises a silicone element or sleeve used in electrical devices or connectors.

Figure 2:
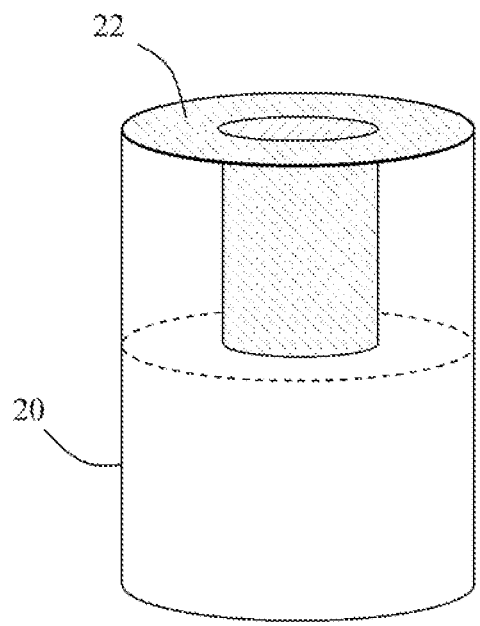
FIG. 2 is a perspective view of a silicone element treated according to the present invention to have a spray coating of conductive ink thinned using a reactive topcoat.

Referring to FIG. 2, an elastomeric substrate 20, such as a silicone cable connector part may be sprayed with the topcoat thinned paste 22 in appropriate locations where flexible conductivity is desired. The topcoat thinned paste according to the present invention may thus be sprayed on irregular surfaces and confined to only those surfaces that are desired to be conductive so that the rest of the substrate will retain its insulting qualities.

The coated substrate may then be cured 18 by drying in an oven or kiln to cure the topcoat thinned paste and bond it to the elastomeric substrate. For example, coated silicone substrates may be dried in an oven at 160 degrees Celsius for approximately 30 minutes to bond the thinned conductive silver paste to the substrate to form a conductive elastomer. The resulting conductive elastomer has a highly conductive and flexible skin without any of the dangerous off-gassing of hydrocarbons from volatile organic compounds used in the solvent.

Figure 3:
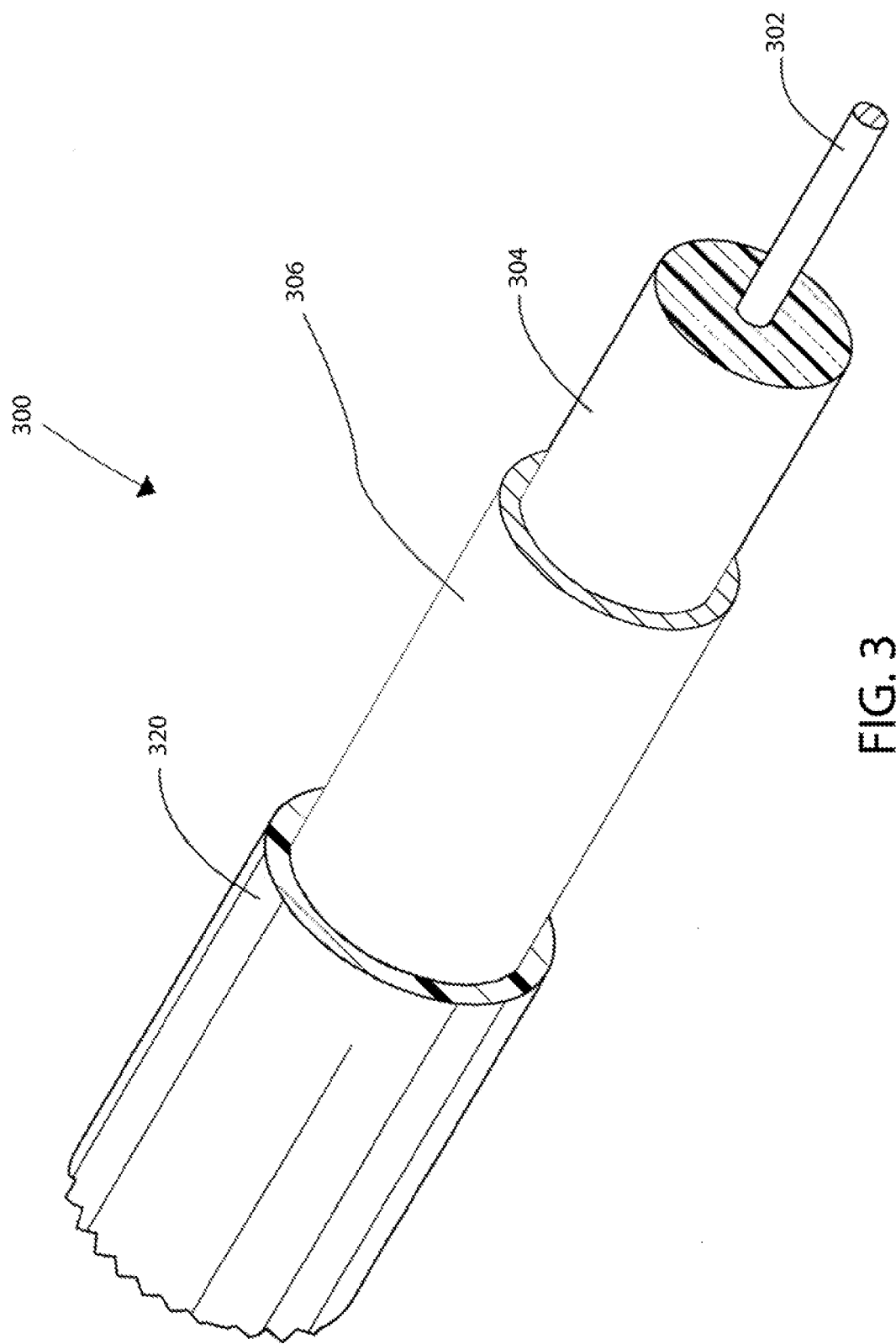
FIGS. 3-13 illustrate cross-sectional perspective views of various embodiments of a cable, in accordance with embodiments of the present invention.

With continued reference to the drawings, FIG. 3 illustrates a cross-sectional perspective view of a cable 300, in accordance with embodiments of the present invention. The cable 300 includes a center conductor 302, an elastomeric layer 304 (i.e., comprising a same material as the elastomeric substrate 20 of FIG. 2), a conductive topcoat layer 306 (i.e., comprising a same material as the topcoat thinned paste 22 of FIG. 2 and formed in a same manner as described with respect to FIGS. 1 and 2), and an insulative jacket 320. Although FIG. 3 illustrates cable 300 as a coaxial cable (e.g., 50 ohm, 75 ohm, etc), note that cable 300 may comprise any type of cable including, among other things, an HDMI cable, an Ethernet cable, a USB cable, etc. The center conductor 302 is positioned at the core of cable 300. The center conductor 302 is configured to carry a range of electrical current (e.g., amperes) as well as an R/F/electronic digital signal. In some example embodiments, the center conductor 302 is formed from solid copper, copper-clad aluminum (CCA), copper-clad steel (CCS), or silver-coated copper-clad steel (SCCCS), although other conductive materials are possible. For example, the center conductor 302 may be formed from any type of conductive metal or alloy. In addition, the center conductor 302 may be solid, hollow, stranded, corrugated, plated, or clad, for example. The elastomeric layer 304 is formed over and in contact with the center conductor 302. The elastomeric layer 304 may comprise, among other things, a layer of silicone (or any other flexible dielectric material) extruded or formed over the center conductor 302. The conductive topcoat layer 306 is formed over and in contact with the elastomeric layer 304. The conductive topcoat layer 306 is formulated to adhere in an extremely flexible bond to the elastomeric layer 304. The conductive topcoat layer 306 is applied uniformly to the elastomeric layer 304. The conductive topcoat layer 306 may be formed from a topcoat (e.g., liquid silicone rubber) and a conductive paste (e.g., comprising any conductive metallic particles, such as, among other things, silver particles or alternatively carbon nanoparticles, etc) mixture. The conductive topcoat layer 306 may be formed by spraying (e.g., by airbrush) the topcoat and conductive paste mixture onto the elastomeric layer 304 and curing the topcoat and conductive paste mixture by heating the topcoat and conductive paste mixture in an oven. Alternatively, the conductive topcoat layer 306 may be formed by bathing the elastomeric layer 304 in the topcoat and conductive paste mixture onto and curing the topcoat and conductive paste mixture by heating the topcoat and conductive paste mixture in an oven. The conductive topcoat layer 306 comprises a shielding layer to shield high frequency electromagnetic fields to/from the center conductor 302. The insulative jacket 320 is formed over and in contact with the conductive topcoat layer 306. The jacket 320 surrounds the conductive topcoat layer 306, and generally serves to protect the internal components (e.g., center conductor 302, conductive top coat layer 306, etc) of the coaxial cable 300 from external contaminants, such as dust, moisture, and oils, as well as wear and tear over time, for example. The jacket 320 may be formed from materials such as, but not limited to, polyethylene (PE), high-density polyethylene (HDPE), low-density polyethylene (LDPE), or linear low-density polyethylene (LLDPE), foamed PE, polyvinyl chloride (PVC), or polyurethane (PU), or some combination thereof.

Figure 4:
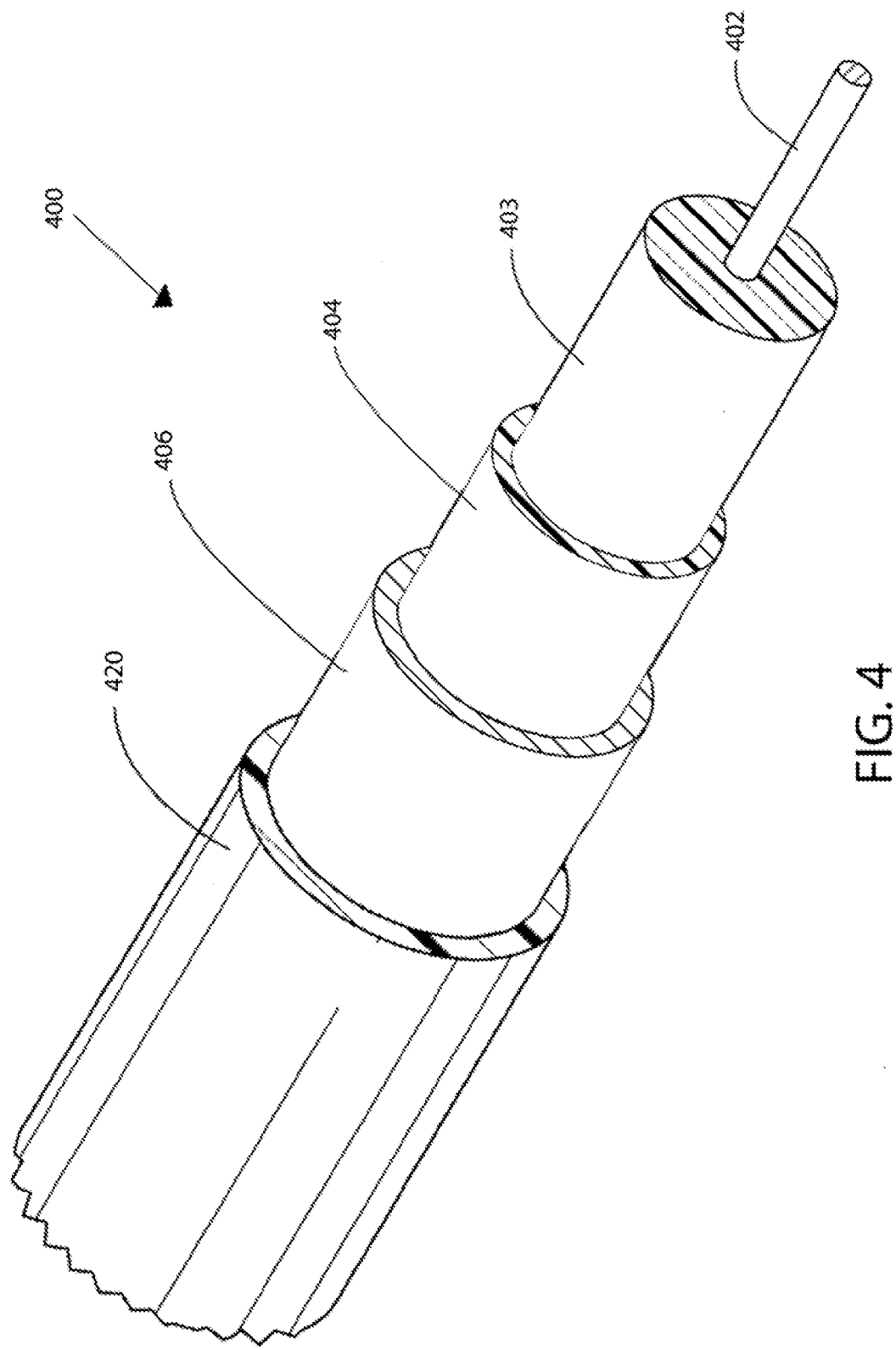

With continued reference to the drawings, FIG. 4 illustrates a cross-sectional perspective view of an alternative cable 400 (to cable 300 of FIG. 3), in accordance with embodiments of the present invention. The cable 400 includes a center conductor 402, a dielectric 403 (in contrast to FIG. 3), an elastomeric layer 404, a conductive topcoat layer 406, and an insulative jacket 420. In contrast to cable 300 of FIG. 3, cable 400 of FIG. 4 includes a dielectric (layer) 403 formed between center conductor 402 (is formed over and in contact with the center conductor 402) and elastomeric layer 404. The dielectric 403 surrounds the center conductor 402, and generally serves to support and insulate the center conductor 402 and the conductive topcoat layer 406. Although not shown in the figures, a bonding agent, such as a polymer, may be employed to bond the dielectric 403 to the center conductor 402. In some example embodiments, the dielectric 403 may be, but is not limited to, taped, solid, or foamed polymer or fluoropolymer. For example, the dielectric 403 may be foamed polyethylene (PE). The elastomeric layer 404 is formed over and in contact with the dielectric 403. The elastomeric layer 404 may comprise, among other things, a layer of silicone (or any other flexible dielectric material) extruded or formed over the dielectric 403.

Figure 5:
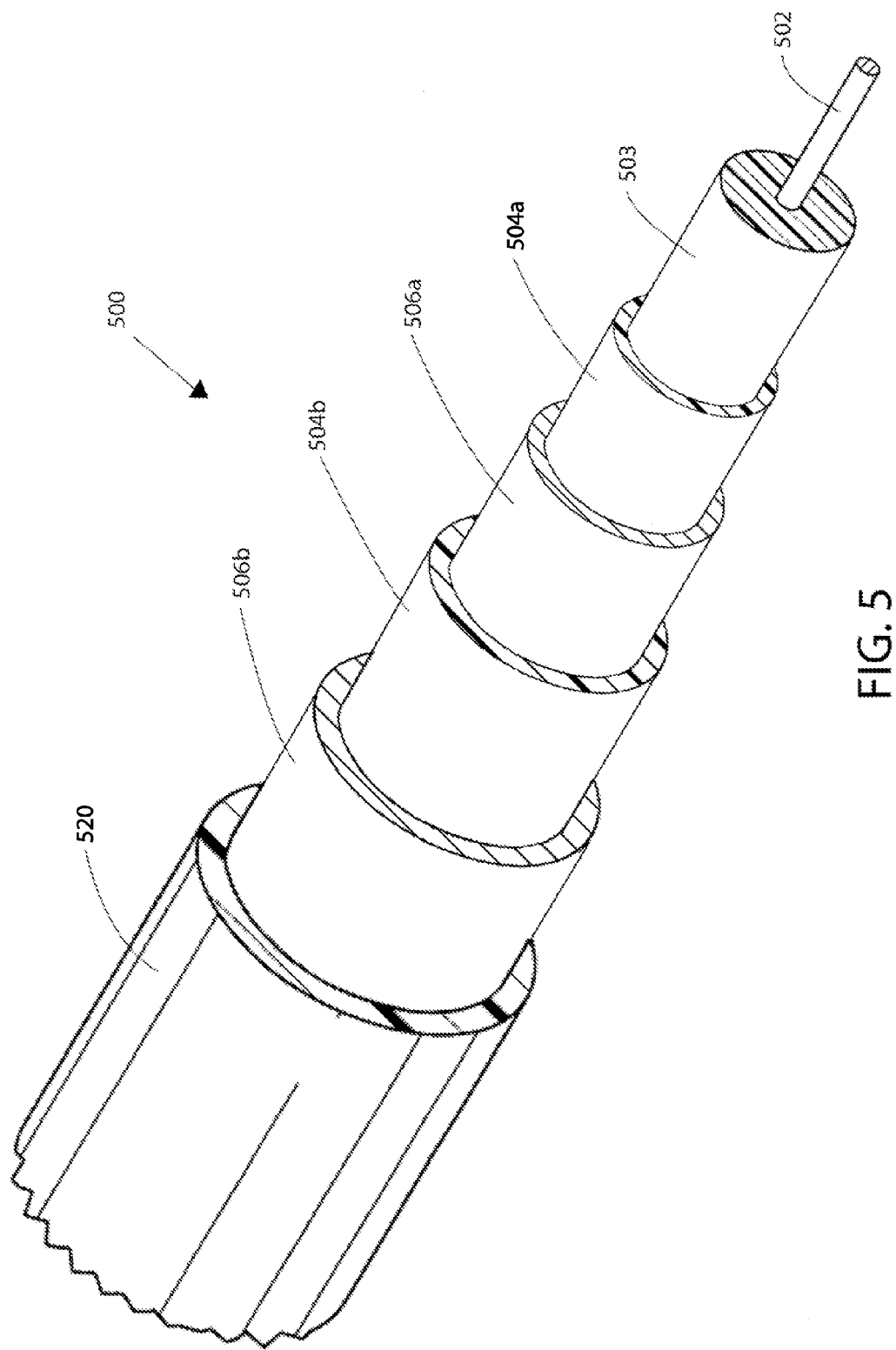

With continued reference to the drawings, FIG. 5 illustrates a cross-sectional perspective view of an alternative cable 500 (to cable 400 of FIG. 4), in accordance with embodiments of the present invention. The cable 500 includes a center conductor 502, a dielectric 503, an elastomeric layer 504a, a conductive topcoat layer 506a, an elastomeric layer 504b, a conductive topcoat layer 506b, and an insulative jacket 520. In contrast to cable 400 of FIG. 4, cable 500 of FIG. 5 includes an (additional) elastomeric layer 504b and a (additional) conductive topcoat layer 406b formed between conductive topcoat layer 506a and insulative jacket 520. Elastomeric layer 504b and conductive topcoat layer 506b may comprise a same or different material as elastomeric layer 504a and conductive topcoat layer 506a. For example, conductive topcoat layers 506a and 506b may each comprise conductive metallic particles, such as, silver particles or alternatively carbon nanoparticles. Alternatively, conductive topcoat layer 506a may comprise conductive metallic particles, such as, silver particles while conductive topcoat layer 506b comprises carbon nanoparticles (or vice versa). Elastomeric layer 504b and conductive topcoat layer 506b provide an extra layer of shielding to shield high frequency electromagnetic fields to/from the center conductor 502.

Figure 6:
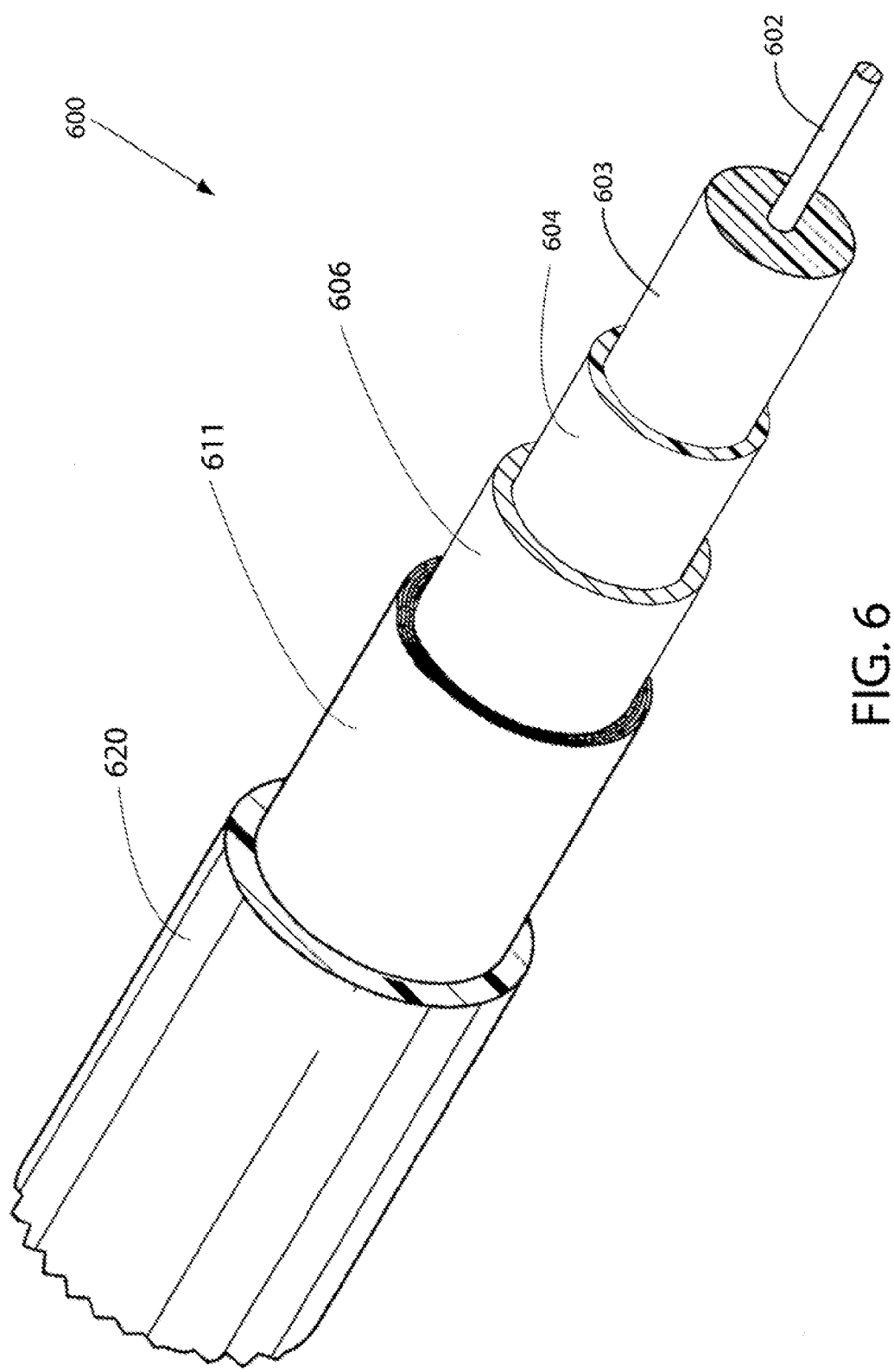

With continued reference to the drawings, FIG. 6 illustrates a cross-sectional perspective view of an alternative cable 600 (to cable 400 of FIG. 4), in accordance with embodiments of the present invention. The cable 600 includes a center conductor 602, a dielectric 603, an elastomeric layer 604, a conductive topcoat layer 606, a conductive tape layer 611, and an insulative jacket 620. In contrast to cable 400 of FIG. 4, cable 600 of FIG. 6 includes a conductive tape layer 611 formed between conductive topcoat layer 606 and insulative jacket 620. The conductive tape layer 611 surrounds the conductive topcoat layer 606 and generally serves as an additional shielding layer (i.e., in addition to conductive topcoat layer 606) to minimize the ingress and egress of high frequency electromagnetic fields to/from the center conductor 602. In some applications, high frequency electromagnetic fields are fields that are greater than or equal to about 50 MHz. The conductive tape layer 611 may comprise a laminate tape that includes, among other things, a first aluminum layer, a polymer layer, a second aluminum layer, and a polymer bonding agent layer.

Figure 7:
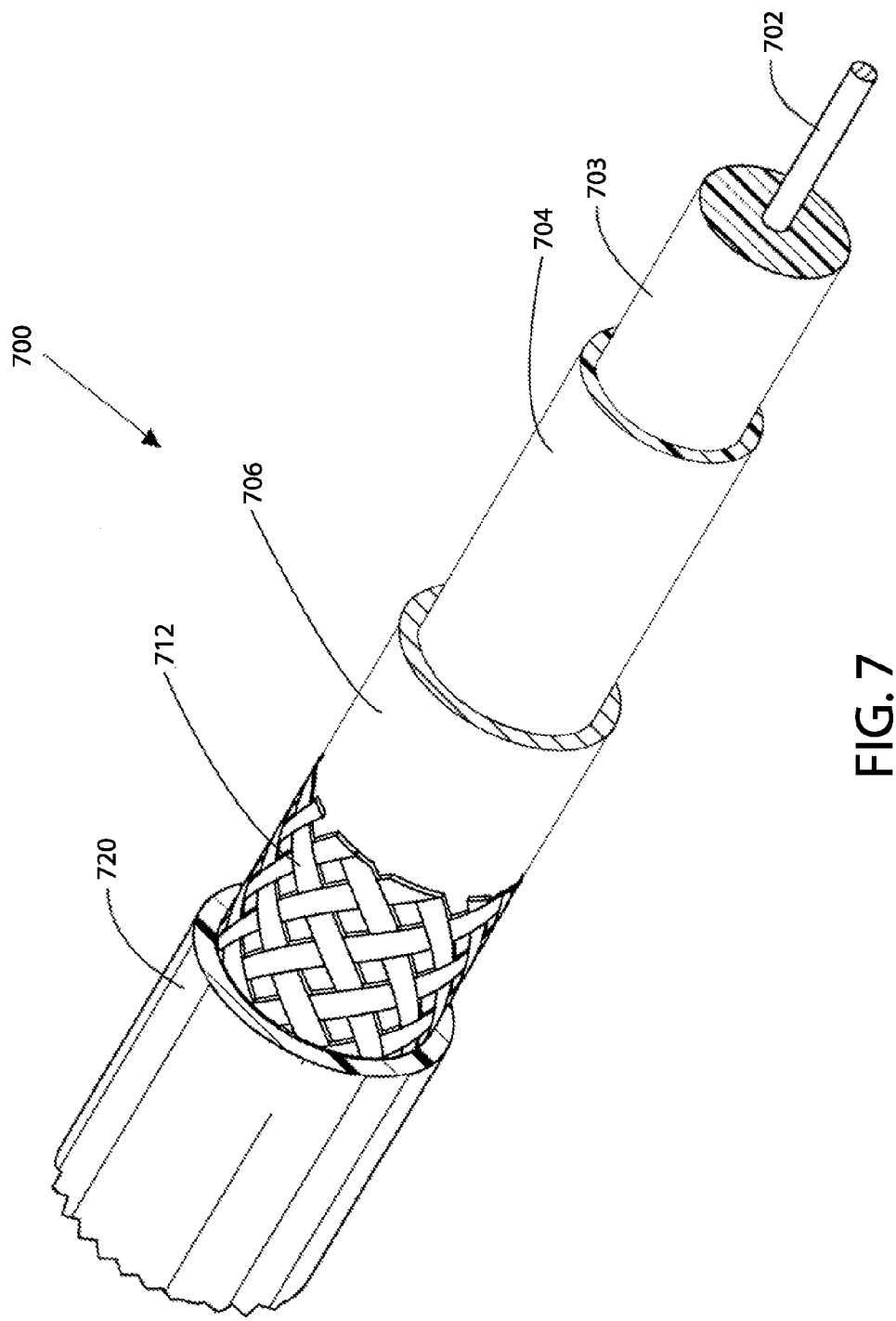

With continued reference to the drawings, FIG. 7 illustrates a cross-sectional perspective view of an alternative cable 700 (to cable 600 of FIG. 6), in accordance with embodiments of the present invention. The cable 700 includes a center conductor 702, a dielectric 703, an elastomeric layer 704, a conductive topcoat layer 706, a conductive braid layer 712, and an insulative jacket 720. In contrast to cable 600 of FIG. 6, cable 700 of FIG. 7 includes a conductive braid layer 712 (i.e., replacing conductive tape layer 611 of FIG. 6) formed between conductive topcoat layer 706 and insulative jacket 720. The conductive braid layer 712 surrounds the conductive topcoat layer 706 and generally serves as an additional shielding layer (i.e., in addition to conductive topcoat layer 706) to minimize the ingress and egress of high frequency electromagnetic fields to/from the center conductor 702. In some applications, high frequency electromagnetic fields are fields that are greater than or equal to about 50 MHz. The conductive braid layer 712 may be formed, for example, from interwoven, fine gauge aluminum or copper wires, such as 34 American wire gauge (AWG) wires. Although the braid wires of the conductive braid layer 712 are depicted as single rectangular wires in FIG. 7, each rectangular wire actually represents several round 34 AWG wires. It is understood, however, that the discussion herein of braid is not limited to braid formed from any particular type or size of wire and/or number of wires.

Figure 8:
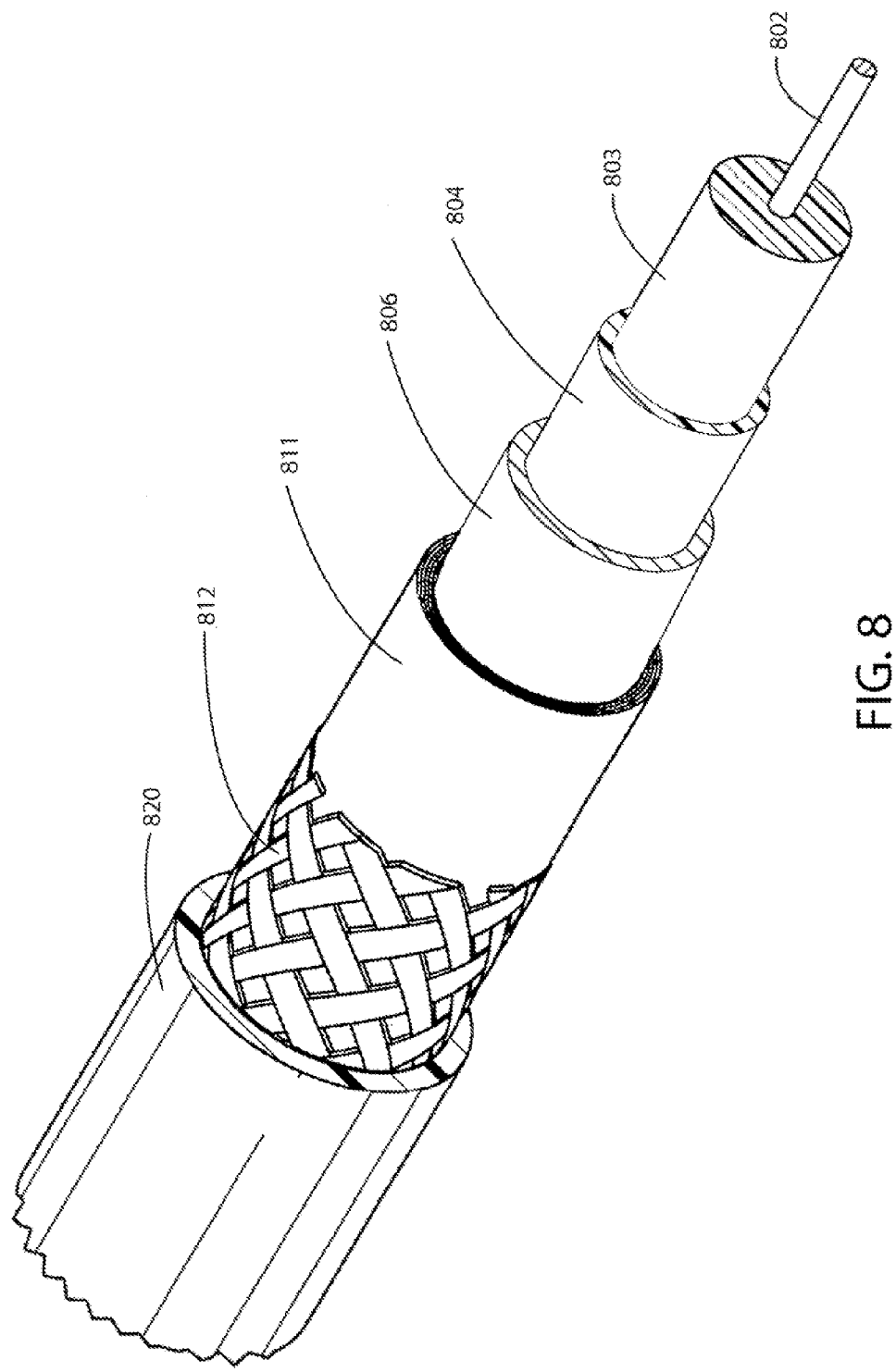

With continued reference to the drawings, FIG. 8 illustrates a cross-sectional perspective view of an alternative cable 800 (to cable 700 of FIG. 7 and cable 600 of FIG. 6), in accordance with embodiments of the present invention. The cable 800 includes a center conductor 802, a dielectric 803, an elastomeric layer 804, a conductive topcoat layer 806, a conductive tape layer 811, a conductive braid layer 812, and an insulative jacket 820. In contrast to cable 700 of FIG. 7 and cable 600 of FIG. 6, cable 800 of FIG. 8 includes a conductive tape layer 811a and conductive braid layer 12 formed between conductive topcoat layer 806 and insulative jacket 820. The conductive tape layer 811 surrounds the conductive topcoat layer 806 and the conductive braid layer 812 surrounds the conductive tape layer 811. The conductive tape layer 811 in combination with the conductive braid layer 812 generally serve as additional shielding layers (i.e., in addition to conductive topcoat layer 806) to minimize the ingress and egress of high frequency electromagnetic fields to/from the center conductor 802.

Figure 9:
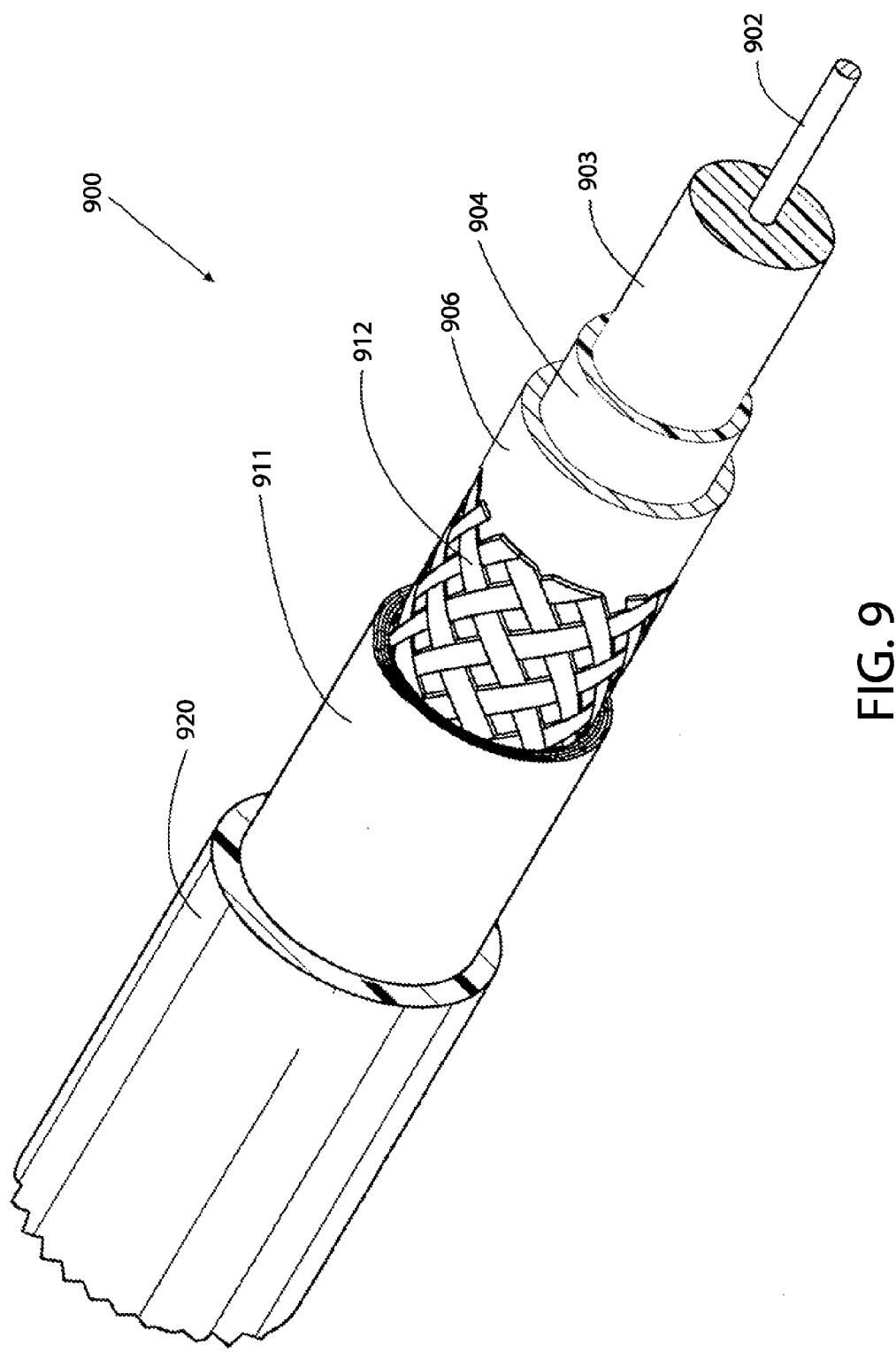

With continued reference to the drawings, FIG. 9 illustrates a cross-sectional perspective view of an alternative cable 900 (to cable 800 of FIG. 8), in accordance with embodiments of the present invention. The cable 900 includes a center conductor 902, a dielectric 903, an elastomeric layer 904, a conductive topcoat layer 906, a conductive braid layer 912, a conductive tape layer 911, and an insulative jacket 920. In contrast to cable 800 of FIG. 8, cable 900 of FIG. 9 includes a reverse order for conductive braid layer 912 and conductive tape layer 911. Conductive braid layer 912 is formed between conductive topcoat layer 906 and conductive tape layer 911. The conductive braid layer 912 surrounds the conductive topcoat layer 906 and the conductive tape layer 911 surrounds the conductive braid layer 912. The conductive tape layer 911 in combination with the conductive braid layer 912 generally serve as additional shielding layers (i.e., in addition to conductive topcoat layer 906) to minimize the ingress and egress of high frequency electromagnetic fields to/from the center conductor 902.

Figure 10:
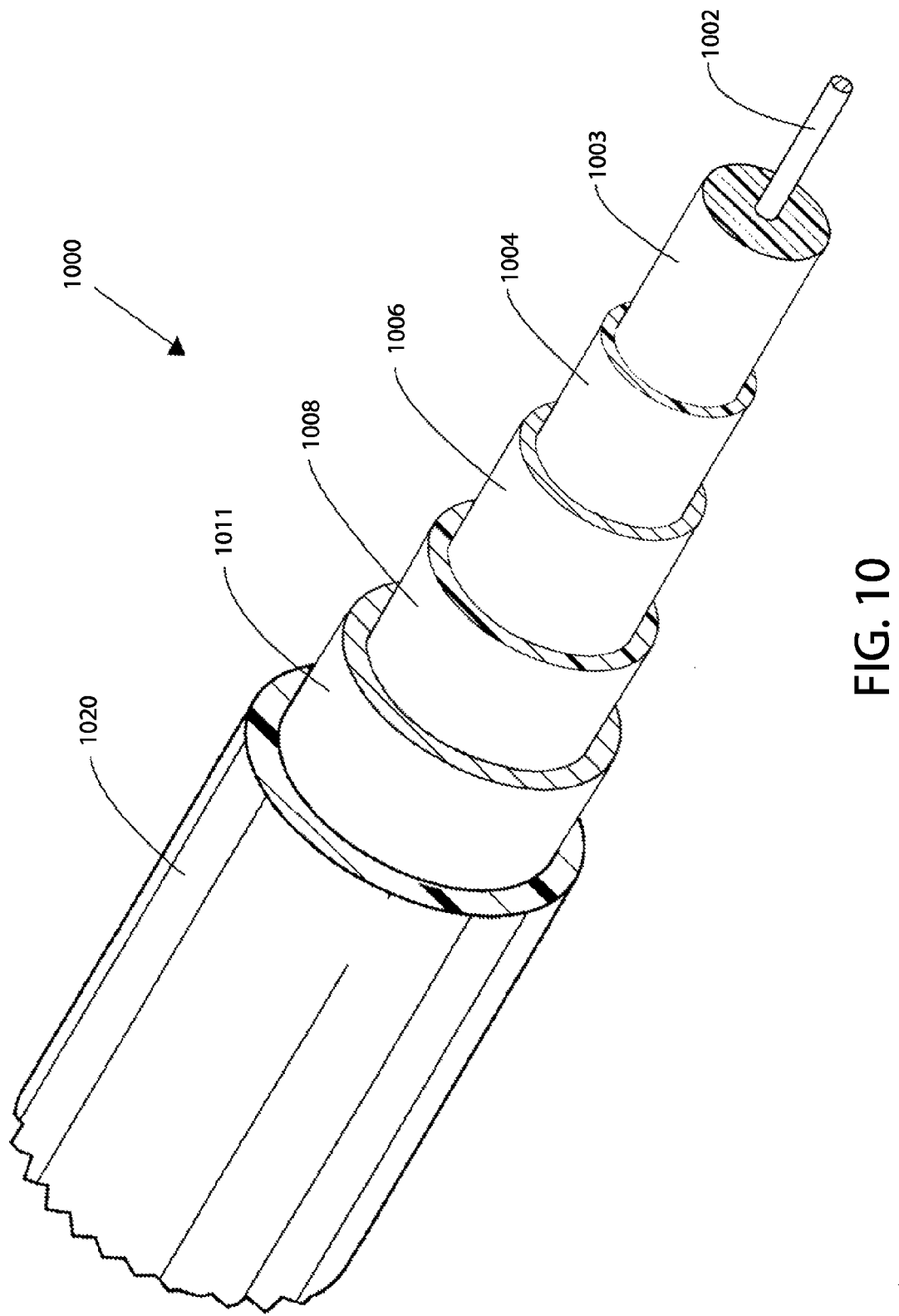

With continued reference to the drawings, FIG. 10 illustrates a cross-sectional perspective view of an alternative cable 1000 (to cable 600 of FIG. 6), in accordance with embodiments of the present invention. The cable 1000 includes a center conductor 1002, a dielectric 1003, an elastomeric layer 1004, a conductive topcoat layer 1006, an (additional) elastomeric layer 1008, a conductive tape layer 1011, and an insulative jacket 1020. In contrast to cable 600 of FIG. 6, cable 1000 of FIG. 10 includes an additional elastomeric layer 1008 formed between conductive tape layer 1011 and conductive topcoat layer 1006. The additional elastomeric layer 1008 generally serves as an additional insulation layer.

Figure 11:
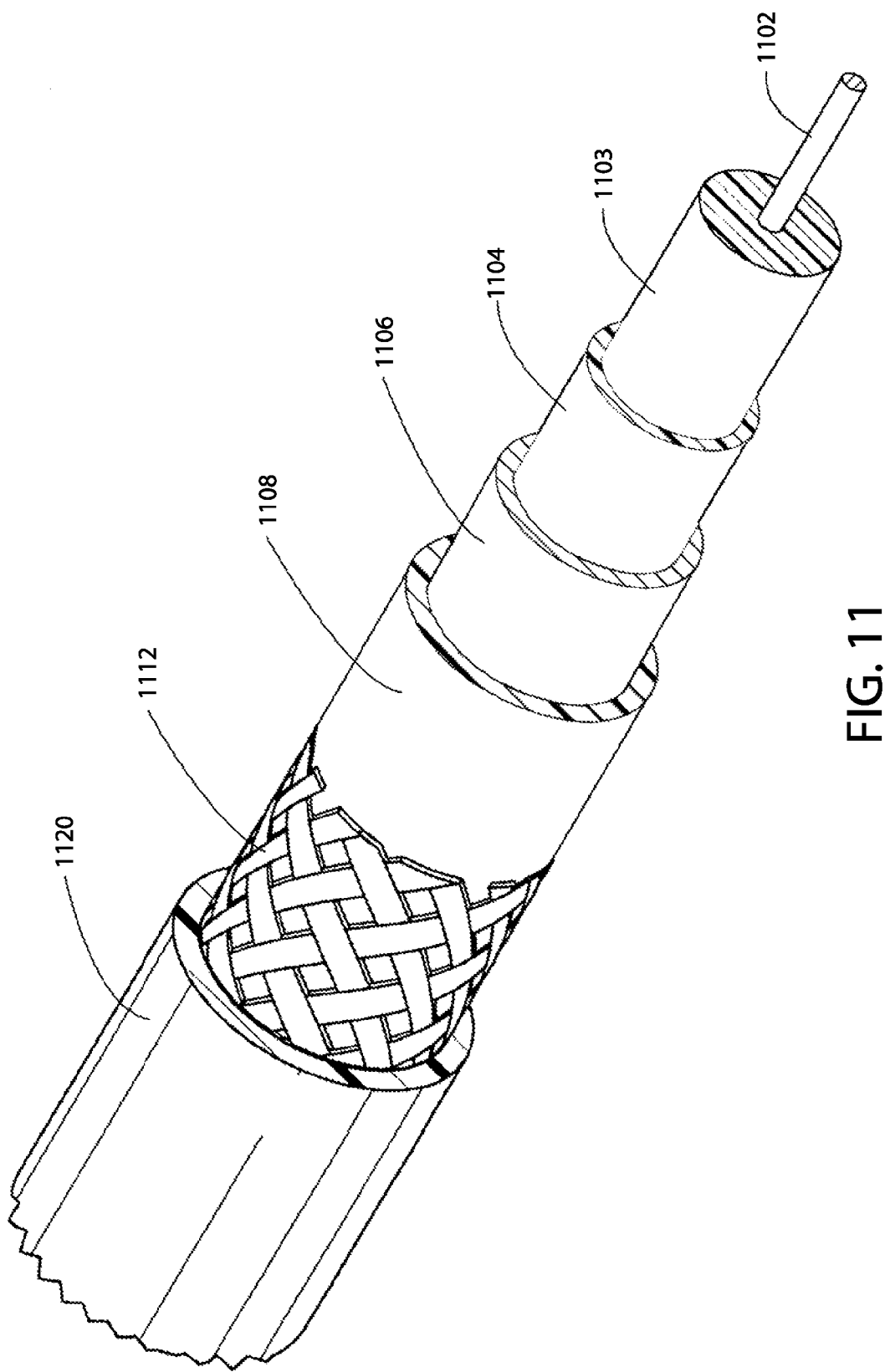

With continued reference to the drawings, FIG. 11 illustrates a cross-sectional perspective view of an alternative cable 1100 (to cable 1000 of FIG. 10), in accordance with embodiments of the present invention. The cable 1100 includes a center conductor 1102, a dielectric 1103, an elastomeric layer 1104, a conductive topcoat layer 1106, an elastomeric layer 1108, a conductive braid layer 1112, and an insulative jacket 1120. In contrast to cable 1000 of FIG. 10, cable 1100 of FIG. 11 includes a conductive braid layer (replacing the conductive tape layer of FIG. 10).

Figure 12A:
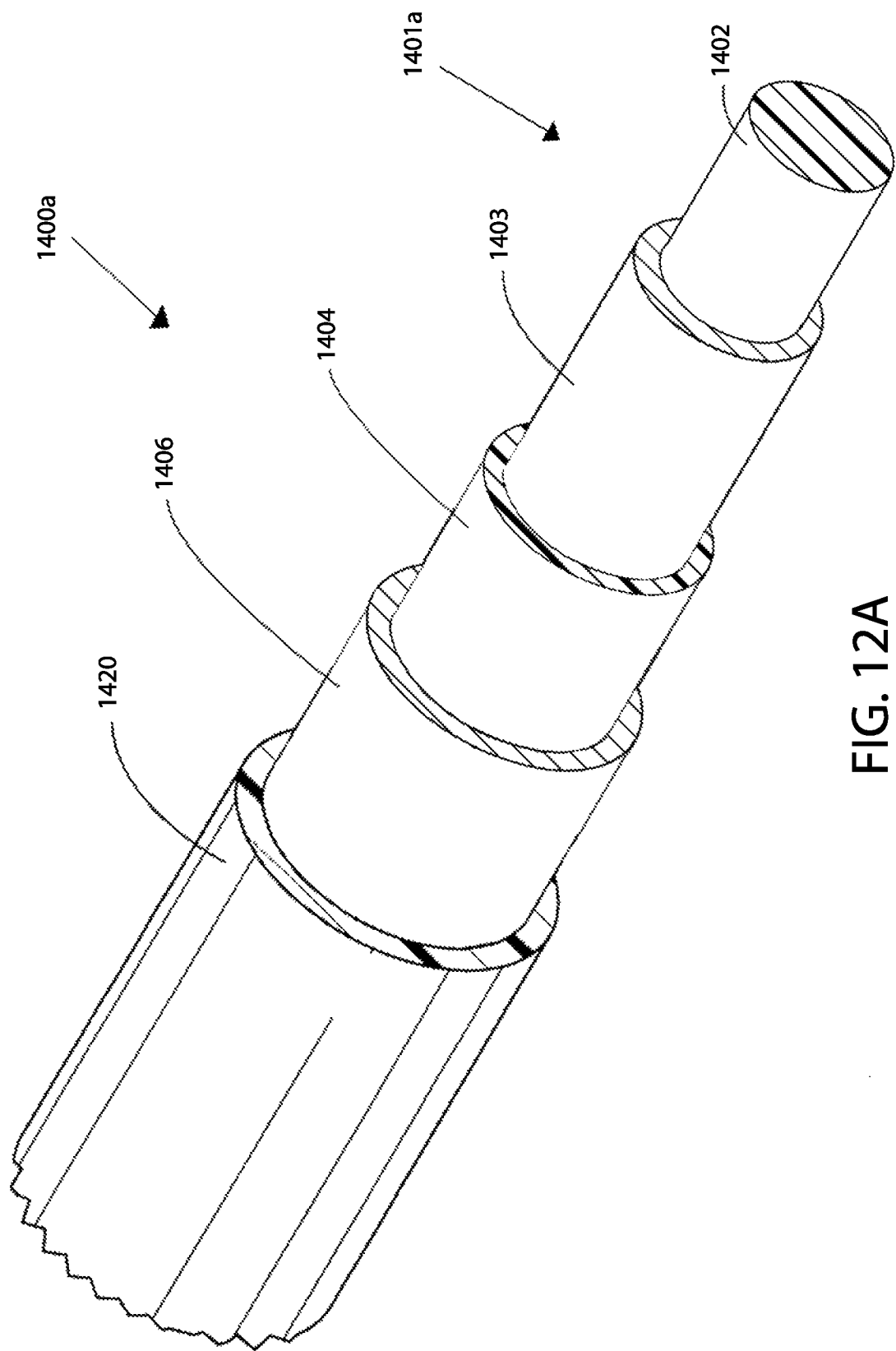

With continued reference to the drawings, FIG. 12A illustrates a cross-sectional perspective view of an alternative cable 1400a (to the cables of FIGS. 3-11), in accordance with embodiments of the present invention. The cable 1400a includes a center conductor structure 1401a (that includes a conductive topcoat layer 1403 surrounding and bonded to an elongated elastomeric structure 1402), an elastomeric layer 1104, a conductive topcoat layer 1406 (for shielding), and an insulative jacket 1420.

Figure 12B:
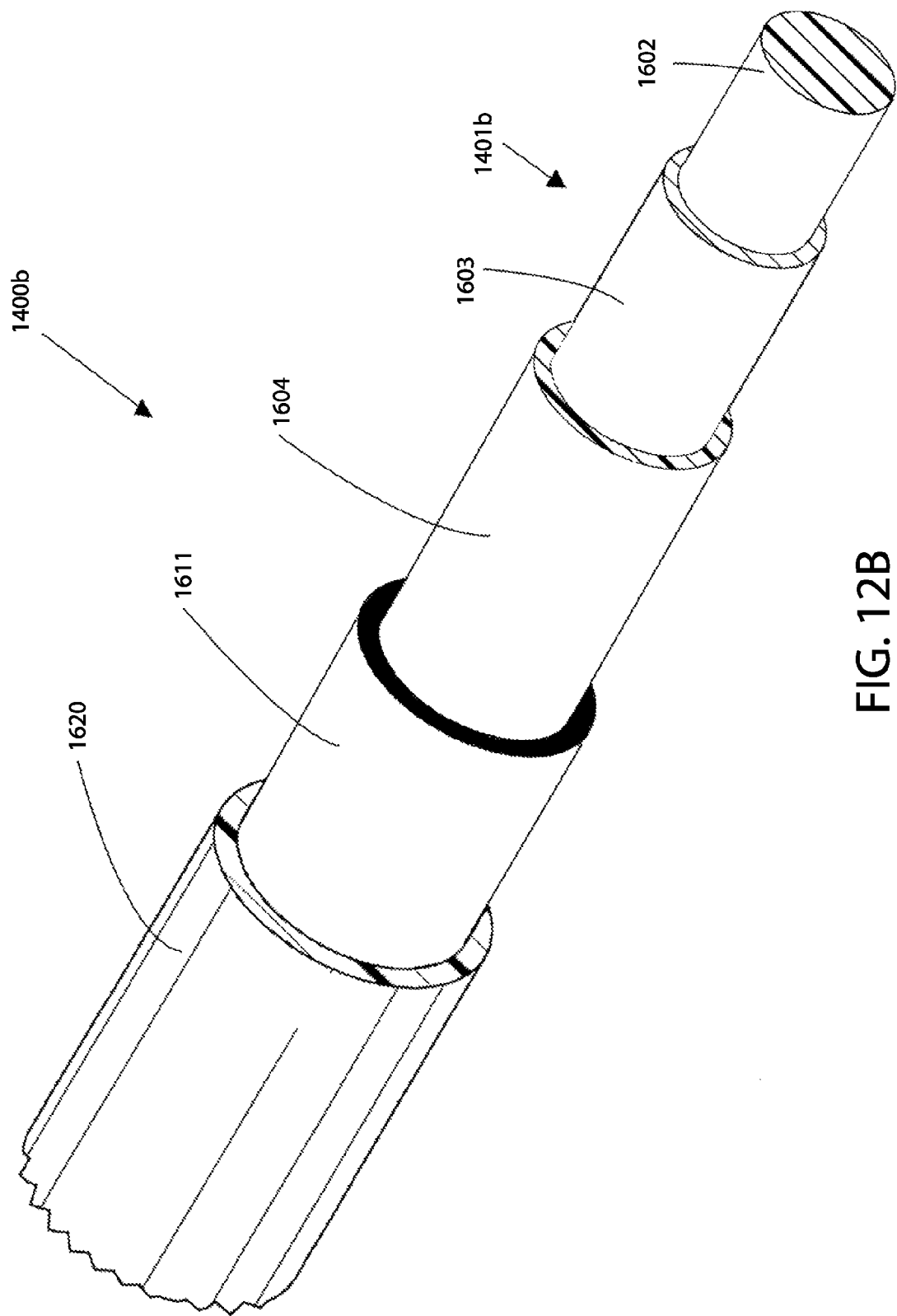

With continued reference to the drawings, FIG. 12B illustrates a cross-sectional perspective view of an alternative cable 1400b (to the cable 1400a of FIG. 12A), in accordance with embodiments of the present invention. The cable 1400b includes a center conductor structure 1401b (that includes a conductive topcoat layer 1603 surrounding and bonded to an elongated elastomeric structure 1602), an elastomeric layer 1604, a conductive tape layer 1611 (for shielding), and an insulative jacket 1620.

Figure 12C:
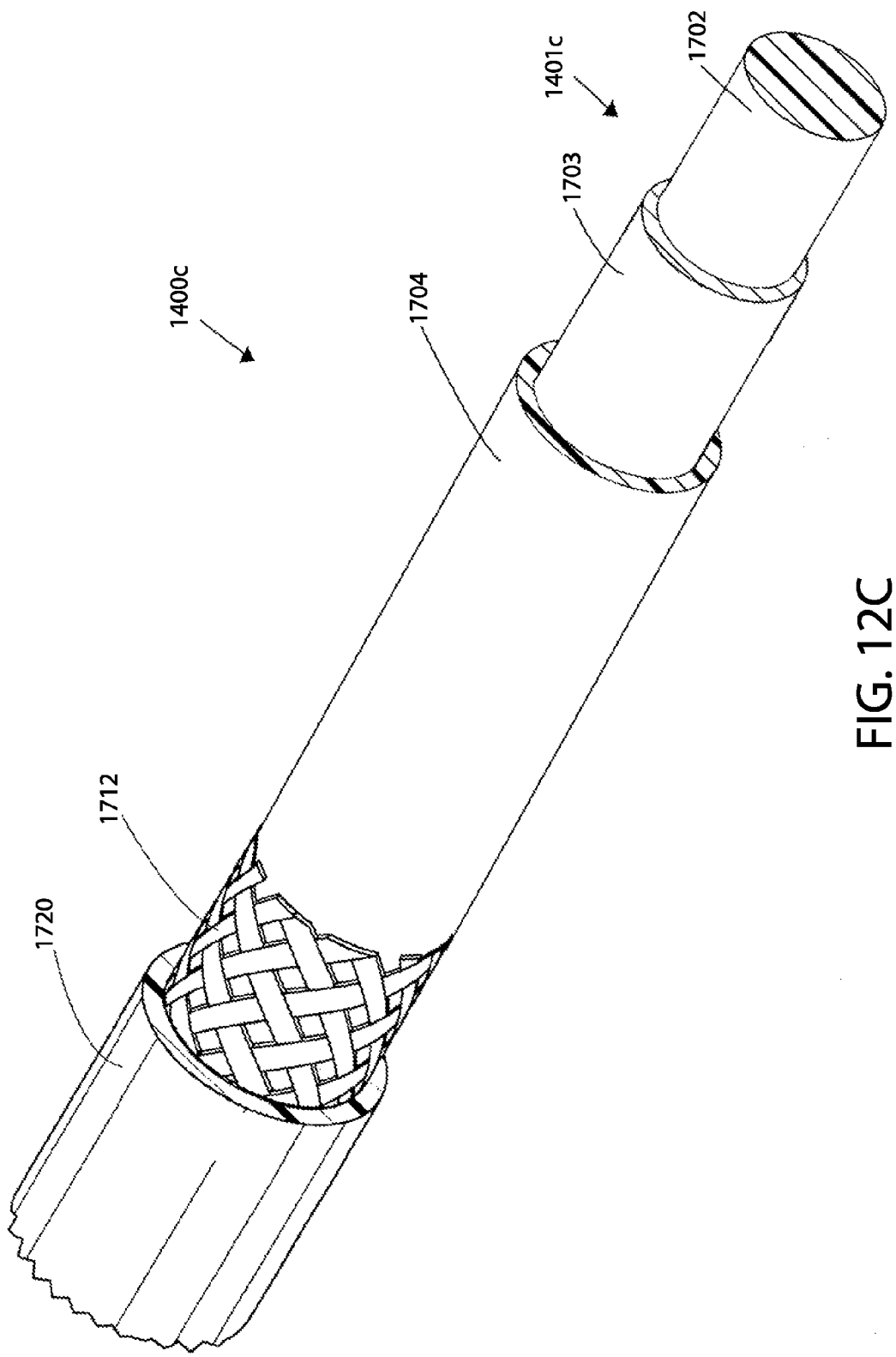

With continued reference to the drawings, FIG. 12C illustrates a cross-sectional perspective view of an alternative cable 1400c (to the cable 1400b of FIG. 12B), in accordance with embodiments of the present invention. The cable 1400c includes a center conductor structure 1401c (that includes a conductive topcoat layer 1703 surrounding and bonded to an elongated elastomeric structure 1702), an elastomeric layer 1704, a conductive braid layer 1712 (for shielding), and an insulative jacket 1720.

Figure 13:
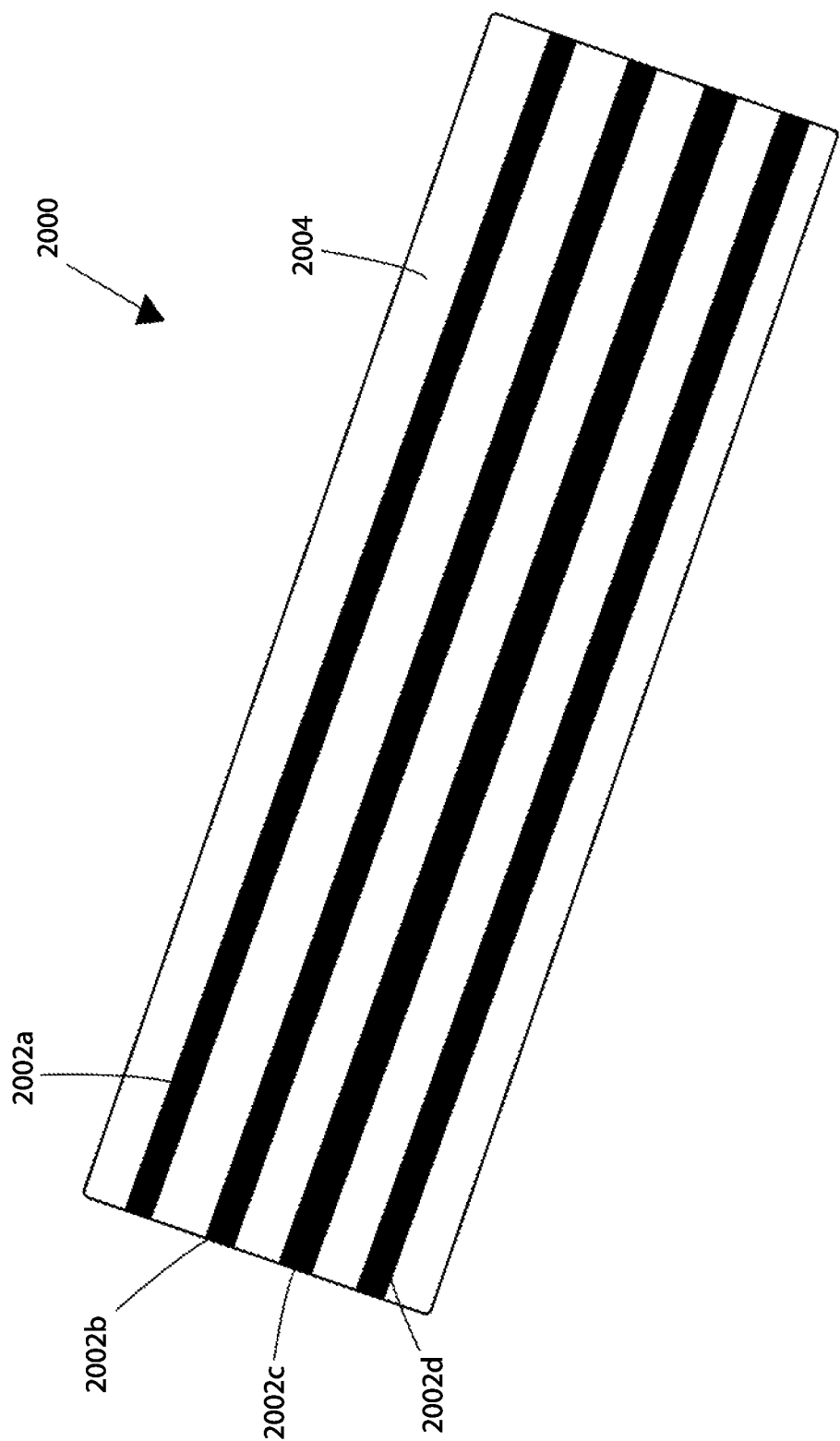

With continued reference to the drawings, FIG. 13 illustrates a perspective view of an alternative (flat ribbon) cable 2000 (to the cables of FIGS. 3-12C), in accordance with embodiments of the present invention. The cable 2000 includes an elongated elastomeric structure 2004 with bonded conductor structures 2000a-2000d (comprising conductive topcoat conductors formed from conductive paste and conductive particles).

Figure 14:
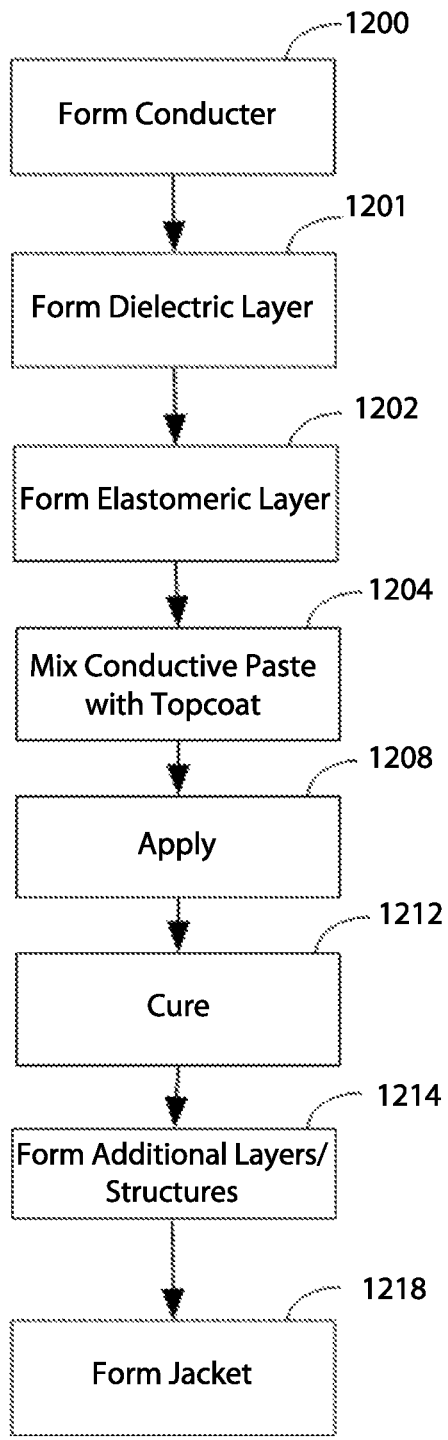
FIG. 14 illustrates a method for forming the cables of FIGS. 3-13, in accordance with embodiments of the present invention.

With continued reference to the drawings, FIG. 14 illustrates a method for forming the cables of FIGS. 3-13, in accordance with embodiments of the present invention. In step 1200, a conductor is formed. For example, center conductors 402-1102 of FIGS. 4-11, respectively or the center conductors of FIGS. 12A-12C each comprising an elongated elastomeric structure (e.g., elastomeric structures 1402, 1602, and 1702 of FIGS. 12A-12C, respectively) in combination with a conductive topcoat layer (e.g., the conductive topcoat layers 1403, 1603, and 1703 of FIGS. 12A-12C, respectively). Alternatively (in the case of a ribbon cable as illustrated in FIG. 13), an elongated elastomeric structure is formed and multiple conductive topcoat structures are bonded to the elongated elastomeric structure. In step 1201, an optional dielectric layer (e.g., dielectric layers 403-1103 of FIGS. 4-11, respectively) is formed over a center conductor (e.g., center conductors 402-1102 of FIGS. 4-11, respectively). In step 1202, an elastomeric layer (e.g., elastomeric layers 404-1103 of FIGS. 4-11, respectively) is formed over the optional dielectric layer. Alternatively, the elastomeric layer may be directly formed over the center conductor without the optional dielectric layer (of step 1200) as illustrated in FIG. 3 (elastomeric layer 304). In step 1204, mixing a conductive paste (e.g., with metallic and/or nanoparticles) is mixed with a topcoat as described with respect to FIGS. 1-3. In step 1208, the topcoat and conductive paste mixture is applied (e.g., by spraying and/or bathing) onto the elastomeric layer to at least partially coat the elastomeric layer. In step 1212, the topcoat and conductive paste mixture is cured (e.g., using heat as described with respect to FIGS. 1-3) to bond the topcoat and conductive paste to the elastomeric layer. The curing process results in a conductive topcoat layer (e.g., conductive topcoat layers 306-1106 of FIGS. 3-11, respectively) formed over the elastomeric layer. In step 1214, the additional layers/structures (e.g., additional elastomeric layers 504b, 1008, 1108; additional conductive top coat layer 506b; tape layers 611, 811, 911, and 1011; and braid layers 712, 812, 912, and 1112) as described with respect to FIGS. 5-11 are formed. In step 1218, an insulative jacket (isolative jacket 320-1120 of FIGS. 3-11) is formed over all layers of the cable.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

What is claimed is:

1. A cable comprising:
   a conductor configured to propagate a signal;
   an elastomeric layer surrounding the conductor; and
   a conductive layer surrounding and bonded to the elastomeric layer,
   wherein the conductive layer is formed from a suspension of conductive particles within a paste material, the paste material is thinned with a reactive topcoat material so as to allow the conductive layer to be bonded to the elastomeric layer without substantial interference from volatile carbon compounds.

2. The cable of claim 1, further comprising: a dielectric formed between said conductor and said elastomeric layer.

3. The cable of claim 1, further comprising: an insulative jacket surrounding the conductive layer.

4. The cable of claim 1, wherein the conductive layer is a conductive shielding layer.

5. The cable of claim 1, further comprising:
   an additional elastomeric layer surrounding the conductive layer; and
   an additional conductive layer surrounding and bonded to the additional elastomeric layer, wherein the additional conductive layer includes a suspension of conductive particles.

6. The cable of claim 1, further comprising: a conductive tape layer surrounding the conductive layer.

7. The cable of claim 1, further comprising:
   a conductive braid layer surrounding the conductive layer.

8. The cable of claim 1, further comprising:
   a conductive tape layer surrounding the conductive layer; and
   a conductive braid layer surrounding the conductive tape layer.

9. The cable of claim 1, further comprising:
   a conductive braid layer surrounding the conductive layer; and
   a conductive tape layer surrounding the conductive braid layer.

10. The cable of claim 1, further comprising:
    an additional elastomeric layer surrounding the conductive layer; and
    a conductive braid layer surrounding the additional elastomeric layer.

11. The cable of claim 1, further comprising:
    an additional elastomeric layer surrounding the conductive layer; and
    a conductive tape layer surrounding the additional elastomeric layer.

12. The cable of claim 1, wherein the cable comprises a cable selected from the group consisting of a coaxial cable, an HDMI cable, and an Ethernet cable.

13. The cable of claim 1, wherein the elastomeric layer is silicone.

14. The cable of claim 1, wherein the suspension of the conductive particles within the paste material is a conductive paste.

15. The cable of claim 1, wherein the reactive topcoat comprises a liquid silicone rubber topcoat.

16. A cable comprising:
    an elongated elastomeric structure; and
    a first conductive topcoat layer surrounding and bonded to the elongated elastomeric structure;
    wherein the first conductive topcoat layer is formed from a suspension of conductive particles within a paste material, the paste material being thinned with a reactive material; and
    wherein the conductive topcoat layer is configured to propagate a signal between two points.

17. The cable of claim 16, further comprising:
    an insulative jacket surrounding the first conductive topcoat layer.

18. The cable of claim 16, further comprising:
    an elastomeric layer surrounding the first conductive topcoat layer; and
    a second conductive topcoat layer surrounding and bonded to the elastomeric layer, wherein the second conductive topcoat layer is formed from a second suspension of conductive particles within a second paste material, and wherein the second conductive topcoat layer is a conductive shielding layer.

19. The cable of claim 18, further comprising: a dielectric formed between said first conductive topcoat layer and said elastomeric layer.

20. The cable of claim 16, further comprising:
    a dielectric layer surrounding the first conductive topcoat layer; and
    a conductive tape layer surrounding the dielectric layer, wherein the conductive tape layer is a conductive shielding layer.

21. The cable of claim 16, further comprising:
    a dielectric layer surrounding the first conductive topcoat layer; and
    a conductive braid layer surrounding the dielectric layer, wherein the conductive braid layer is a conductive shielding layer.

22. A ribbon cable comprising:
    an elongated elastomeric structure;
    a first conductive topcoat structure bonded to the elongated elastomeric structure, wherein the first conductive topcoat structure extends a length of the elongated elastomeric structure, and wherein the first conductive topcoat structure is configured to propagate a first signal; and
    a second conductive topcoat structure bonded to the elongated elastomeric structure, wherein the second conductive topcoat structure extends the length of the elongated elastomeric structure, wherein the second conductive topcoat structure is electrically isolated from the first conductive topcoat structure, wherein the second conductive topcoat structure is configured to propagate a second signal differing from said first signal, and wherein the first conductive topcoat structure and the second conductive topcoat structure are each formed from a suspension of conductive particles within a paste material, the paste material being thinned with a reactive material.

23. A method of forming a cable, comprising the steps of:
    forming an elastomeric layer over a conductor, wherein the conductor is configured to propagate a signal;
    mixing a conductive paste with a topcoat;
    applying the topcoat and conductive paste mixture onto the elastomeric layer to at least partially coat the elastomeric layer; and
    curing the topcoat and conductive paste mixture to bond the topcoat and conductive paste to the elastomeric layer, wherein said curing results in a conductive topcoat layer formed over the elastomeric layer.

24. The method of claim 23, further comprising: forming a dielectric between the conductor and the elastomeric layer.

25. The method of claim 23, further comprising: forming an insulative jacket surrounding the conductive topcoat layer.

26. The method of claim 23, further comprising:
    forming an additional elastomeric layer surrounding the conductive topcoat layer;

mixing additional conductive paste with an additional topcoat;

applying the additional topcoat and the additional conductive paste mixture onto the additional elastomeric layer to at least partially coat the additional elastomeric layer; and curing the additional topcoat and the additional conductive paste mixture to bond the additional topcoat and the additional conductive paste to the additional elastomeric layer, wherein said curing the additional topcoat and the additional conductive paste mixture results in an additional conductive topcoat layer formed over the additional elastomeric layer.

27. The method of claim 23, further comprising: forming a conductive tape layer surrounding the conductive topcoat layer.

28. The method of claim 23, further comprising: a conductive braid layer surrounding the conductive topcoat layer.

29. The method of claim 23, further comprising:
forming a conductive tape layer surrounding the conductive topcoat layer; and
forming a conductive braid layer surrounding the conductive tape layer.

30. The method of claim 23, further comprising:
forming a conductive braid layer surrounding the conductive topcoat layer; and
forming a conductive tape layer surrounding the conductive braid layer.

31. The method of claim 23, further comprising:
forming an additional elastomeric layer surrounding the conductive topcoat layer; and forming a conductive braid layer surrounding the additional elastomeric layer.

32. The method of claim 23, further comprising:
forming an additional elastomeric layer surrounding the conductive topcoat layer; and
forming a conductive tape layer surrounding the additional elastomeric layer.

33. The method of claim 23, wherein the conductive paste comprises silver particles.

34. The method of claim 23, wherein the elastomeric layer is silicone.

35. The method of claim 34, wherein the topcoat is a liquid silicone rubber topcoat.

36. The method of claim 35, wherein the step of curing the topcoat and conductive paste mixture comprises heating the topcoat and conductive paste mixture in an oven.

37. The method of claim 23, wherein the step of applying the topcoat and conductive paste mixture comprises spray coating said mixture onto the elastomeric layer.

38. The method of claim 37, wherein the step of spray coating the mixture onto said elastomeric layer is performed by using an airbrush.

39. The method of claim 23, wherein the step of applying the topcoat and conductive paste mixture comprises bathing said the elastomeric layer in said mixture.

40. A method of forming a cable, comprising the steps of:
forming elongated elastomeric structure;
mixing a conductive paste with a topcoat;
applying the topcoat and conductive paste mixture onto the elongated elastomeric structure to at least partially coat the elongated elastomeric structure; and
curing the topcoat and conductive paste mixture to bond the topcoat and conductive paste to the elongated elastomeric structure, wherein said curing results in a conductive topcoat layer formed over the elongated elastomeric structure, and wherein the conductive topcoat layer is configured to propagate a signal between two points.

41. The method cable of claim 40, further comprising:
forming an insulative jacket surrounding the conductive topcoat layer.

42. The method of claim 40, further comprising:
forming an elastomeric layer surrounding the conductive topcoat layer;
applying additional topcoat and conductive paste mixture onto the elastomeric layer to at least partially coat the elastomeric layer; and
additionally curing the additional topcoat and conductive paste mixture to bond the additional topcoat and conductive paste mixture to the elastomeric layer, wherein said additionally curing results in a second conductive topcoat layer formed over the elastomeric layer, and wherein the second conductive topcoat layer is a conductive shielding layer.

43. A method of forming a cable, comprising the steps of:
mixing a conductive paste with a topcoat;
first applying a first portion of the topcoat and conductive paste mixture onto an elongated elastomeric structure, the first portion extending a length of the elongated elastomeric structure;
second applying a second portion of the topcoat and conductive paste mixture onto the elongated elastomeric structure, the second portion being adjacent to the first portion and extending the length of the elongated elastomeric structure, wherein the first portion is isolated from the second portion; and
curing the first portion and the second portion so as to bond the first portion and the second portion to the elongated elastomeric structure, wherein said curing results in a first conductive topcoat layer and a second conductive topcoat layer formed over the elongated elastomeric structure, wherein the first conductive topcoat layer is electrically isolated from the second conductive topcoat layer, wherein the first conductive topcoat layer is configured to propagate a first signal, and wherein the second conductive topcoat layer is configured to propagate a second signal differing from the first signal.

44. A cable comprising:
a conductor configured to propagate a signal;
an elastomeric layer arranged around at least a portion of the conductor; and
a conductive topcoat layer arranged around at least a portion of the elastomeric layer;
wherein the conductive topcoat layer includes a conductive paste thinned with a reactive and non-organic solvent so as to allow the conductive paste to form a bond with the elastomeric layer without interference from a volatile carbon compound.

45. The cable of claim 44, further comprising:
an additional elastomeric layer arranged around at least a portion of the conductive topcoat layer; and
a conductive tape layer surrounding the additional elastomeric layer.

46. The cable of claim 1, wherein the paste material is not thinned with an organic solvent.

47. The method of claim 23, wherein the conductive paste is not thinned with an organic solvent.

48. The method of claim 23, wherein the conductive paste is configured to avoid volatile carbon compounds.

49. The method of claim 23, wherein the conductive paste is configured to be bonded to the elastomeric layer without being thinned by an organic solvent.

50. The method of claim 23, wherein the conductive paste is configured to be thinned by a reactive topcoat so as to form a flexible topcoat layer around the elastomeric layer and be bonded to the elastomeric layer without interference from volatile carbon compounds.

* * * * *